United States Patent
Wood et al.

(10) Patent No.: US 8,642,198 B2
(45) Date of Patent: *Feb. 4, 2014

(54) BATTERY SYSTEM WITH TEMPERATURE SENSORS

(75) Inventors: Steven J. Wood, Shorewood, WI (US); Dale B. Trester, Milwaukee, WI (US)

(73) Assignee: Johnson Controls Technology Center, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/614,206

(22) Filed: Sep. 13, 2012

(65) Prior Publication Data

US 2013/0011706 A1 Jan. 10, 2013

Related U.S. Application Data

(63) Continuation of application No. 12/084,060, filed as application No. PCT/US2006/039288 on Oct. 6, 2006, now Pat. No. 8,309,241.

(60) Provisional application No. 60/730,908, filed on Oct. 27, 2005.

(51) Int. Cl.
*H01M 10/50* (2006.01)
*H01M 2/00* (2006.01)
*H01M 4/00* (2006.01)
*H01M 10/48* (2006.01)
*H01M 2/10* (2006.01)

(52) U.S. Cl.
USPC .................. 429/62; 429/61; 429/66; 429/90; 429/186

(58) Field of Classification Search
USPC ................... 429/66, 62, 90, 61, 186
See application file for complete search history.

(56) References Cited

U.S. PATENT DOCUMENTS

| | | | |
|---|---|---|---|
| 4,727,006 A | 2/1988 | Malinowski et al. | |
| 4,816,737 A | 3/1989 | Delmas et al. | |
| 6,410,184 B1 | 6/2002 | Horiuchi et al. | |
| 7,059,769 B1 | 6/2006 | Potega | |
| 8,309,241 B2 * | 11/2012 | Wood et al. | 429/90 |
| 2002/0182480 A1 | 12/2002 | Hanauer et al. | |

FOREIGN PATENT DOCUMENTS

GB 2387232 10/2003

OTHER PUBLICATIONS

Chinese Office Action for CN Application No. 200680047982.3; dated Aug. 28, 2009, 10 pages.
European Office Action for EP Application No. 06825608.0; dated Nov. 27, 2009, 2 pages.
International Search Report and Written Opinion for International Application No. PCT/US2006/039288, dated Mar. 15, 2007, 8 pages.
Response to European Office Action for EP Application No. 06825608.0; dated Mar. 25, 2010, 6 pgs.

* cited by examiner

*Primary Examiner* — Patrick Ryan
*Assistant Examiner* — Julian Anthony
(74) *Attorney, Agent, or Firm* — Foley & Lardner LLP

(57) ABSTRACT

A battery system includes a platform having an aperture formed therethrough, a flexible member having a generally planar configuration and extending across the aperture, wherein a portion of the flexible member is coextensive with the aperture, a cell provided adjacent the platform, and a sensor coupled to the flexible member and positioned proximate the cell. The sensor is configured to detect a temperature of the cell.

20 Claims, 6 Drawing Sheets

BATTERY SYSTEM WITH TEMPERATURE SENSORS

CROSS-REFERENCE TO RELATED PATENT APPLICATIONS

This application is a Continuation of U.S. patent application Ser. No. 12/084,060, filed on Apr. 24, 2008, as a national phase application of International Application PCT/U.S. 2006/039288, filed Oct. 6, 2006, which in turn claims the benefit of and priority to U.S. Provisional Patent Application No. 60/730,908, filed Oct. 27, 2005. The entire disclosures of U.S. patent application Ser. No. 12/084,060, International Application PCT/U.S. 2006/039288, and U.S. Provisional Patent Application No. 60/730,908 are incorporated herein by reference.

STATEMENT REGARDING FEDERALLY SPONSORED RESEARCH OR DEVELOPMENT

The government of the United States has rights in this invention pursuant to Contract No. DE-FC26-95EE50425 awarded by the U.S. Department of Energy.

BACKGROUND

The present inventions relate to batteries (e.g., lithium-ion batteries, lithium-polymer batteries, nickel-metal hydride (NiMH) batteries, etc.) and systems using such batteries. More specifically, the present inventions relate to battery systems that utilize one or more temperature sensors to measure or detect the temperature of cells within the battery system.

It is known to provide batteries for use in vehicles such as automobiles. For example, lead-acid batteries have been used in starting, lighting, and ignition applications. More recently, hybrid vehicles have been produced which utilize a battery (e.g., a nickel-metal-hydride battery) in combination with other systems (e.g., an internal combustion engine) to provide power for the vehicle.

It is generally known that lithium batteries (e.g., lithium-ion batteries, lithium-polymer batteries, etc.) perform differently than nickel-metal-hydride batteries. In some applications, it may be desirable to obtain the enhanced power/performance of a lithium battery. For example, lithium batteries may provide greater specific power than nickel-metal-hydride batteries. However, the application of lithium battery technology may present design and engineering challenges beyond those typically presented in the application of conventional nickel-metal-hydride battery technology.

The design and management of a lithium battery system that can be advantageously utilized in a hybrid vehicle may involve considerations such as electrical performance monitoring, thermal management, and containment of effluent (e.g., gases that may be vented from a battery cell).

Current methods of thermal management include providing a temperature sensor on a battery module. The sensors are attached to the module using additional parts and clips and are exposed to ambient temperature gradients which may affect performance and accuracy of the measured temperature.

It would be advantageous to provide an improved system for monitoring temperature in a lithium battery module. It would also be advantageous to provide a system for monitoring temperature that is relatively simple and economical, and which may be relatively easily assembled. It would be desirable to provide a system including any one or more of these or other advantageous features as may be apparent to those reviewing the present disclosure.

SUMMARY

According to an exemplary embodiment, a battery system includes a platform having an aperture formed therethrough, a flexible member having a generally planar configuration and extending across the aperture, wherein a portion of the flexible member is coextensive with the aperture, a cell provided adjacent the platform, and a sensor coupled to the flexible member and positioned proximate the cell. The sensor is configured to detect a temperature of the cell.

According to another exemplary embodiment, a battery system includes a platform, a cell supported by the platform and having a bottom end, a flexible member positioned beneath the bottom end of the cell, and a sensor coupled to the flexible member and positioned proximate the bottom end of the cell. The sensor is configured to detect a temperature of the cell.

According to another exemplary embodiment, a battery system includes a platform including a top surface, a plurality of apertures extending through the top surface, and a plurality of cells supported by the platform, each of the plurality of cells aligned with one of the plurality of apertures. The battery system also includes a plurality of temperature sensors, each of the plurality of sensors provided proximate an end of one of the plurality of cells and aligned with the associated aperture. The battery system further includes a plurality of flexible members, each of the flexible members positioned beneath an end of one of the plurality of cells and having a generally planar configuration that extends across the associated aperture. The flexible members are configured to support the associated sensor to allow movement of the associated sensor while maintaining it proximate the associated cell.

DETAILED DESCRIPTION

According to an exemplary embodiment, a battery system or module is provided that includes a plurality of batteries or cells (e.g., lithium-ion cells, lithium-polymer cells, NiMH cells, etc.). It should be noted that while particular exemplary embodiments are shown and described in the present application for the cells and modules, features described herein may be utilized with cells of any presently known configuration or other configuration that may be developed in the future.

Various nonexclusive exemplary embodiments of lithium batteries and lithium battery systems are shown and described in U.S. patent application Ser. No. 10/976,169, filed Oct. 28, 2004, and in International Application No. PCT/U.S. 2005/030244 filed Aug. 25, 2005, the entire disclosures of which are hereby incorporated by reference. The batteries, modules, and other features described herein, including the temperature sensors and related devices, may be used in conjunction with features disclosed in U.S. patent application Ser. No. 10/976,169 and/or International Application No. PCT/U.S. 2005/030244, as will be appreciated by those of skill in the art reviewing this disclosure.

While FIGS. 1-8 illustrate particular exemplary embodiments of batteries and battery systems, any of a variety of batteries or battery systems may be used according to various exemplary embodiments. For example, according to various exemplary embodiments, the physical configuration of the individual cells and/or the modules may be varied according to design objectives and considerations (e.g., cells having a generally oval cross-sectional shape, cells having a generally cylindrical shape, and cells having a generally prismatic shape).

Features of exemplary batteries or cells that may be used with battery systems or modules such as those shown and described herein are described in detail below. It should be understood by those reviewing this disclosure that similar or identical features may be included in cells according to any of the embodiments shown herein. According to other exemplary embodiments, additional and/or different features may be provided for cells used in such embodiments.

Figure 1:
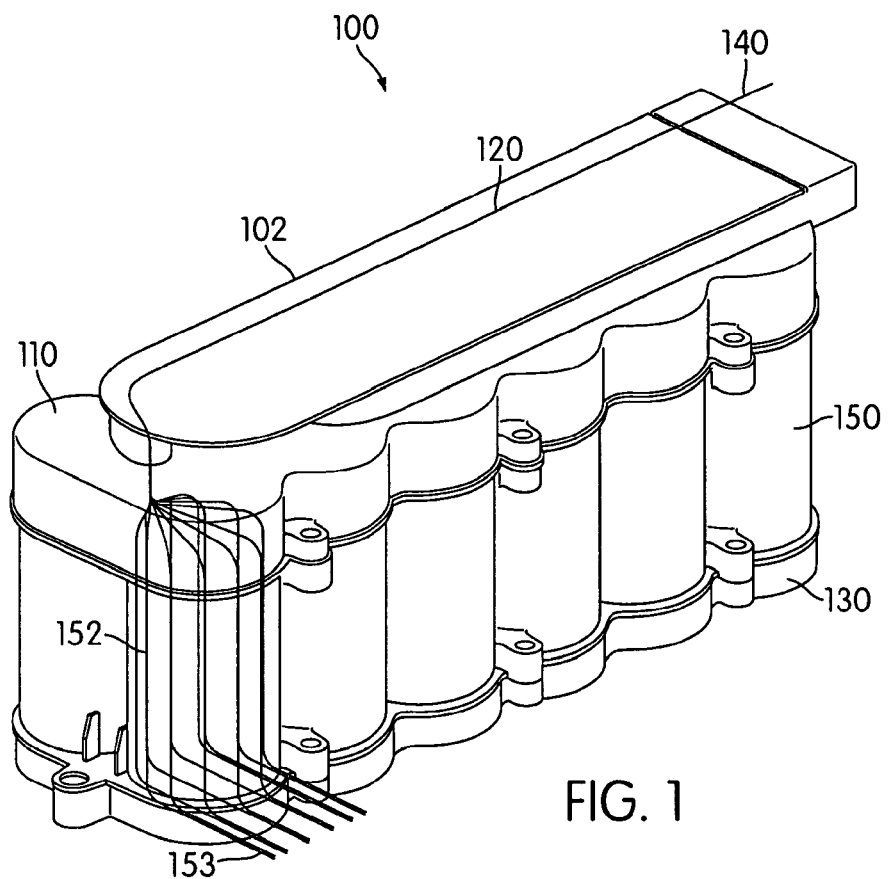
FIG. 1 is a perspective view of a battery system or module that includes a plurality of battery cells according to an exemplary embodiment.

According to an exemplary embodiment, a cell (e.g., cell 150 as shown in FIG. 1) includes a container and a cover (which may be referred to and/or be provided in the form of, for example, as an end cover, collar, cap, top portion, end portion, etc.) for sealing the cells. According to various exemplary embodiments, the cover may be made from any suitable material (e.g., metals, plastics, composites, etc.). The containers of the cells may have any of a variety of shapes, sizes, and configurations. For example, a container may be octagonal, cylindrical, generally flattened-oval, octal-oval, prismatic, or any of a variety of other shapes.

Within the cell containers, the cells include electrodes (e.g., positive and negative electrodes) and separators that are wound or wrapped such that they have a generally oval or elliptical shape (or other shape, depending on the shape of the container used) to form a cell element. An element or strap may be coupled to the one or more electrodes of a single polarity type (e.g., the positive electrode(s) or the negative electrode(s)) and to the associated terminals to couple the associated electrode(s) and terminals and to gather or collect current and/or heat from within a cell).

Terminals are provided for electrically coupling to cells to each other and to the vehicle electrical system, and are coupled to the straps. According to an exemplary embodiment, each cell includes two positive and two negative terminals. According to other exemplary embodiments, a different number of positive and negative terminals may be provided for each cell.

Each cell may also include one or more vents for allowing effluent (e.g., gas, liquid, and/or other materials) to escape (e.g., to be exhausted or expressed from) the interior of the cell. The vent may be a valve such as relief or burst valve to permit effluent to escape the cell. An aperture may be in fluid communication with the interior of the cell. When the cell is in its normal operating mode, the aperture is blocked by some element. In the event that effluent builds up to a predetermined threshold, the element may move to expose the aperture such that effluent may escape the cell. According to an exemplary embodiment, a vent may be configured to allow gas and/or other materials to escape from the cell when the pressure within the cell reaches a particular threshold (e.g., a high pressure threshold of between approximately 3 psi and 30 psi).

A plurality of cells electrically coupled together may be arranged in a module, such as that shown in U.S. patent application Ser. No. 10/976,169 (e.g., having channels for airflow and effluent removal, etc.), for use with the present invention.

The number of cells provided within a particular module may vary according to various exemplary embodiments. Further, it should be noted that battery systems may include any number of modules which include any number of batteries (e.g., three modules may be provided within a battery system, each of which may include any suitable number of cells). The particular configuration utilized for a battery system and/or module may be optimized to provide power for a particular application according to various exemplary embodiments.

According to an exemplary embodiment, a module may have a voltage of between approximately 40 and 48 volts and that is rated at 12 amp hours and which includes 12 cells. The dimensions of such a module may be approximately 95 mm wide by 143 mm tall by 421 mm long, with a weight of approximately 7 kg. According to various other exemplary embodiments, the dimensions, ratings, or other characteristics may differ according to any of a variety of desired characteristics.

Figure 2:
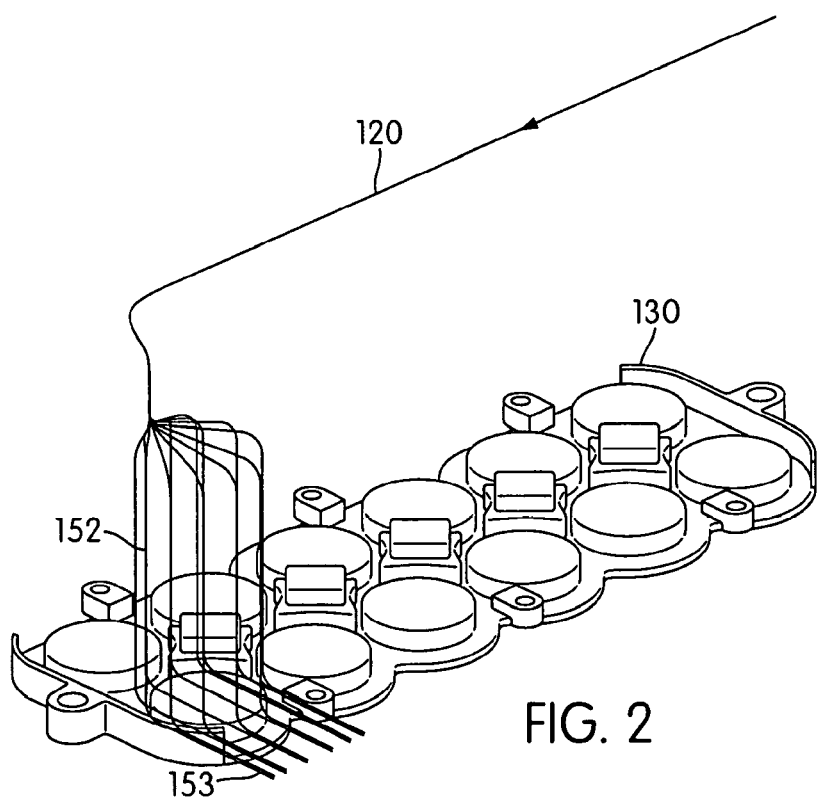
FIG. 2 is a perspective view of a portion of the battery system or module shown in FIG. 1.

FIGS. 1-2 illustrate a battery module 100 according to an exemplary embodiment that includes a plurality of battery cells 150 (e.g. prismatic, oval, or cylindrical cells). The module 100 includes a manifold or cooling system 110 configured to provide a cooling fluid (e.g., air) that passes over at least a portion (e.g., the terminals) of the cells 150 of the module 100 in parallel fashion (e.g., a cover 102 having channels provided therein may be utilized). That is, the cooling fluid is routed such that it does not pass over all cells 150 of the module 100 (which would accumulate heat as the air passed from one cell to the next), but rather, is instead routed such that it passes over only one or two of the cells 150. The fluid (e.g., air) flow is represented by lines 120, 152, and 153 shown in FIG. 2. According to an exemplary embodiment shown in FIG. 2, the cooling fluid (shown in line 152) passes downward along cell 150 (e.g., across the terminals and down along the housing of the cell), after which it is exhausted at a member or base 130 of module 100 (shown by line 153). While FIGS. 1-2 illustrate a battery module having a manifold system for providing a cooling fluid adjacent cells of the module, according to other exemplary embodiments, a different manifold system or no manifold system is provided According to an exemplary embodiment, a battery system or module may include one or more members or devices for monitoring, sensing, detecting, or determining the temperature of one or more cells included in the battery system or module. FIGS. 3-8 illustrate exemplary embodiments in which a temperature sensing member or device 242 (e.g., a temperature sensor) is provided adjacent or in contact with at least one of the cells 150 of a battery module 100 for individually sensing the temperature of the cells 150. It should be noted that such temperature sensors may be provided in any of the exemplary embodiments shown in this disclosure, including embodiments that utilize oval, cylindrical, and prismatic cells. For simplicity, similar elements are numbered with identical reference numerals even though their configuration may not be identical.

Figure 3:
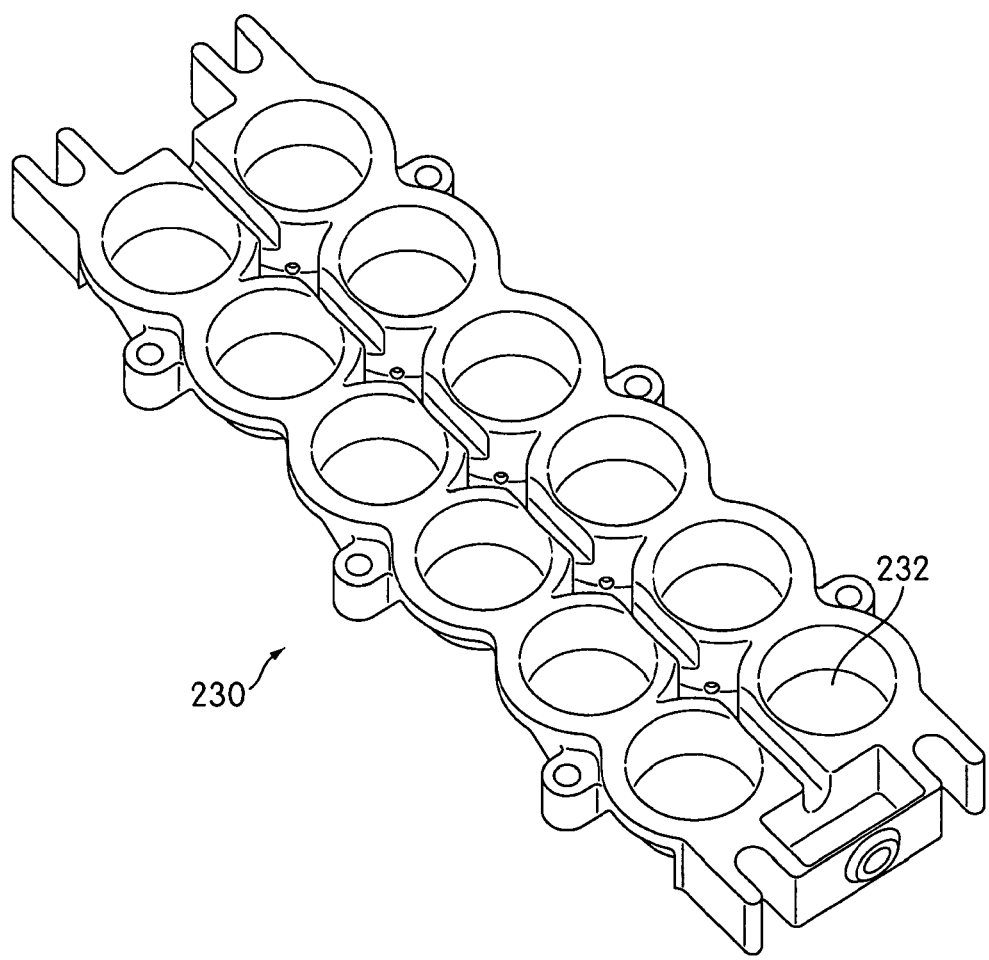
FIG. 3 is a perspective view of a battery tray according to an exemplary embodiment.

FIG. 3 illustrates a perspective view of the underside of a member or base 230 (e.g., a battery tray) of a battery system or module according to an exemplary embodiment. Member 230 is similar to member 130 shown in FIGS. 1-2 in that the member 230 includes a plurality of features or platforms 232 on which batteries or cells 250 may rest (see, e.g., FIG. 4, showing a cell 250 arranged or provided on a feature or platform 232).

According to an exemplary embodiment, one or more wires 240 (FIG. 4) are provided such that they extend through an aperture or hole formed in a portion of the base 230. According to an exemplary embodiment shown in FIGS. 4-6, the wires 240 extend through an aperture or hole 234 formed in a feature 236 (e.g., a spacer or extension that extends into interstitial space between adjacent cells in the battery system or module) provided as part of the base 230. The feature 236 is provided in relatively close proximity to the platform 232 and, accordingly, to a cell which may be provided on the platform 232.

A member or device 242 for measuring or determining temperature (e.g., a temperature sensor) is electrically coupled to the wire 240. According to an exemplary embodiment, the device 242 is provided on the platform 232 such that it is provided proximate or in contact with a cell (e.g., cell 250) that is provided on the platform 232. Any suitable type of temperature sensor may be utilized according to various exemplary embodiments (e.g., the sensor may include a thermistor, a thermocouple, etc.).

Figure 4:
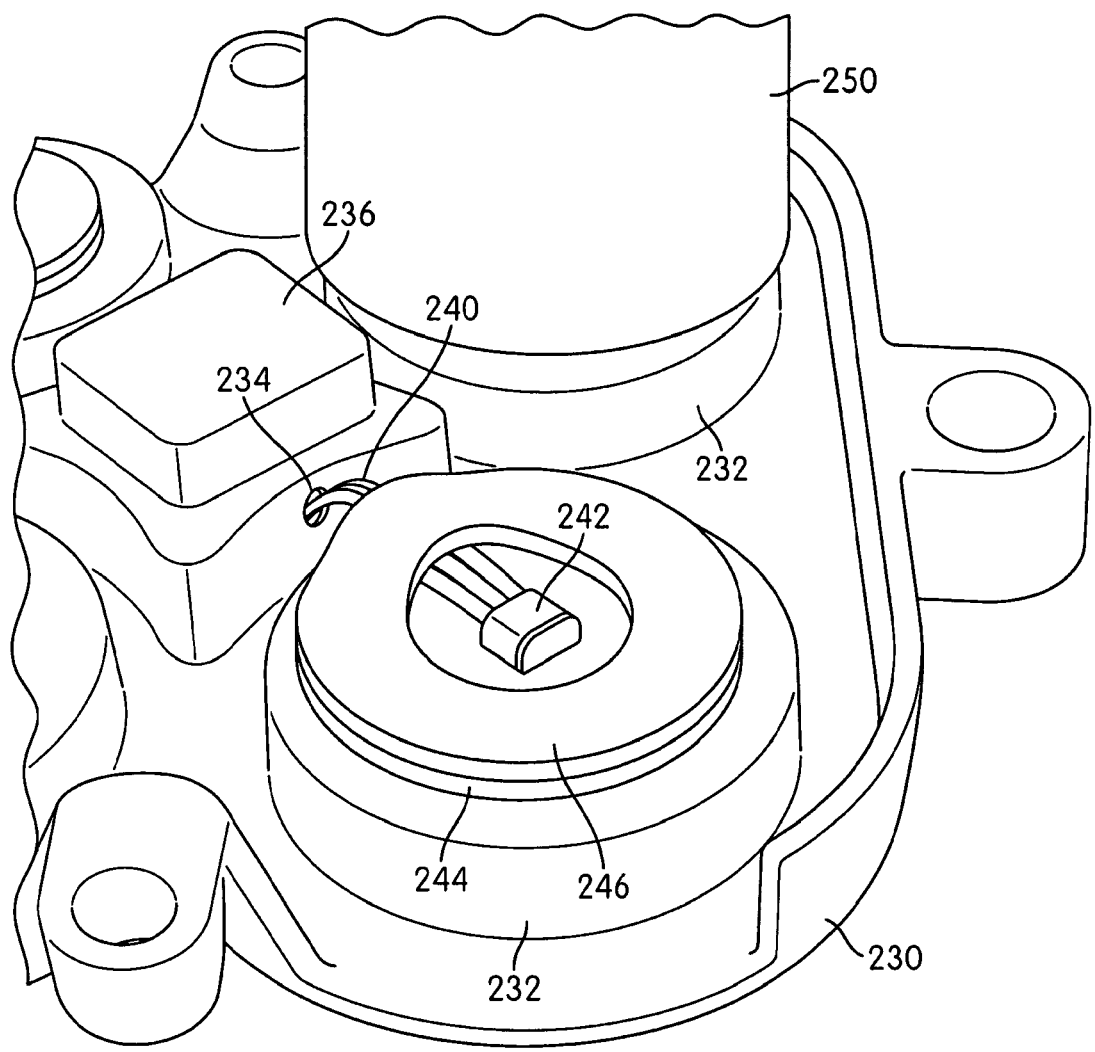
FIG. 4 is a perspective view of a portion of a battery system or module that includes a temperature sensing device according to an exemplary embodiment.
Figure 5:
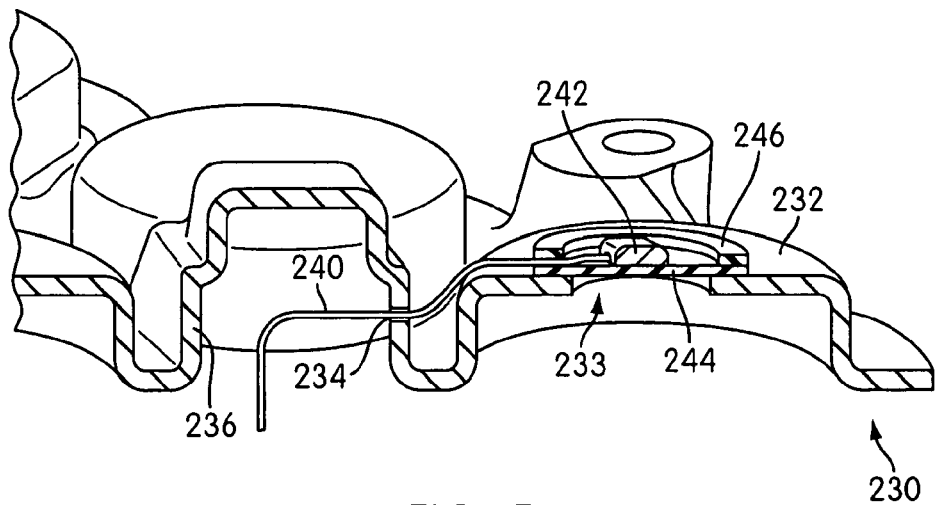
FIG. 5 is a cross-sectional view of a portion of the portion of the battery system shown in FIG. 4.
Figure 6:
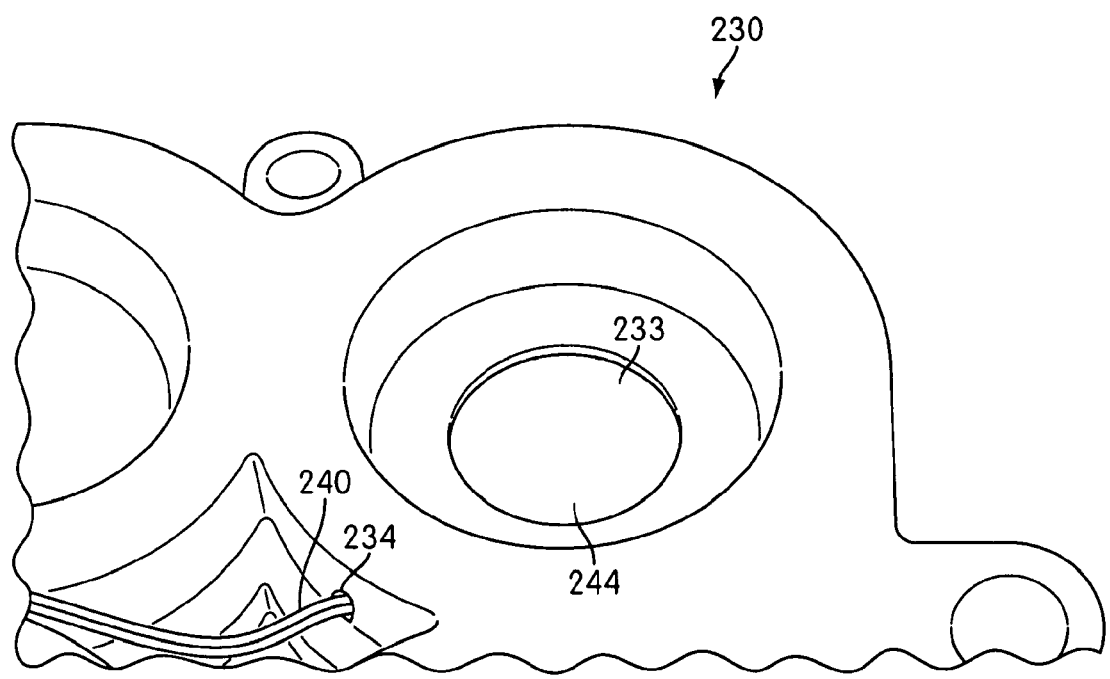
FIG. 6 is another perspective view showing the portion of the battery system shown in FIG. 4.

FIGS. 4-6 illustrates placement of the device 242 according to an exemplary embodiment. The platform 232 includes an aperture or hole 233 provided in the top surface thereof. The device 242 is provided above the aperture 233 and rests on a flexible member 244 such as a diaphragm. One advantageous feature of providing a flexible member 244 is that the temperature sensor may be maintained in close proximity of the bottom of a cell 250 that is provided on the platform 232 with an appropriate level of force. For example, when placed on the platform 232, the cell may force the device 242 downward through the aperture 233. The flexible member 244 allows for movement of the device 242 while maintaining close proximity between the device 242 and the cell 250 (e.g., the flexible member 244 may be made of a relatively resilient material). FIG. 6 illustrates a portion of the underside of the base 230 illustrating the flexible member 244 in position adjacent the aperture 233.

A member or element 246 such as a gasket or washer (e.g., a ring-like structure or member) is provided above the flexible member 244 according to an exemplary embodiment. According to an exemplary embodiment, the member 246 surrounds the device 242 to provide a relatively isolated environment in which the device 242 may operate (e.g., a cooling fluid such as air flowing by the cells may not pass over the device 242, which allows for more accurate temperature sensing for the cell). By providing gasket 246, the need to encapsulate the temperature sensor with an epoxy or other material may be eliminated, as it keeps the temperature sensor within the proximity of the cell.

The one or more wires 240 extending from the device 242 may be coupled to a system (e.g., a battery management system, a vehicle communication system such as a vehicle bus, etc). The system may act to control the temperature of the module and/or individual cells within the module based at least in part on information transmitted from the device 242. For example, in the event that the temperature of a cell or a module exceeds a predetermined threshold, the module may be disconnected from the vehicle power system according to an exemplary embodiment. According to another exemplary embodiment, individual cells may be disconnected from the vehicle power system. Other actions may also be taken according to other exemplary embodiments (e.g., routing additional cooling fluid to a particular cell, decreasing the amount of power provided by a particular cell, etc.) that are intended to manage the temperature of individual cells in the module.

Figure 7:
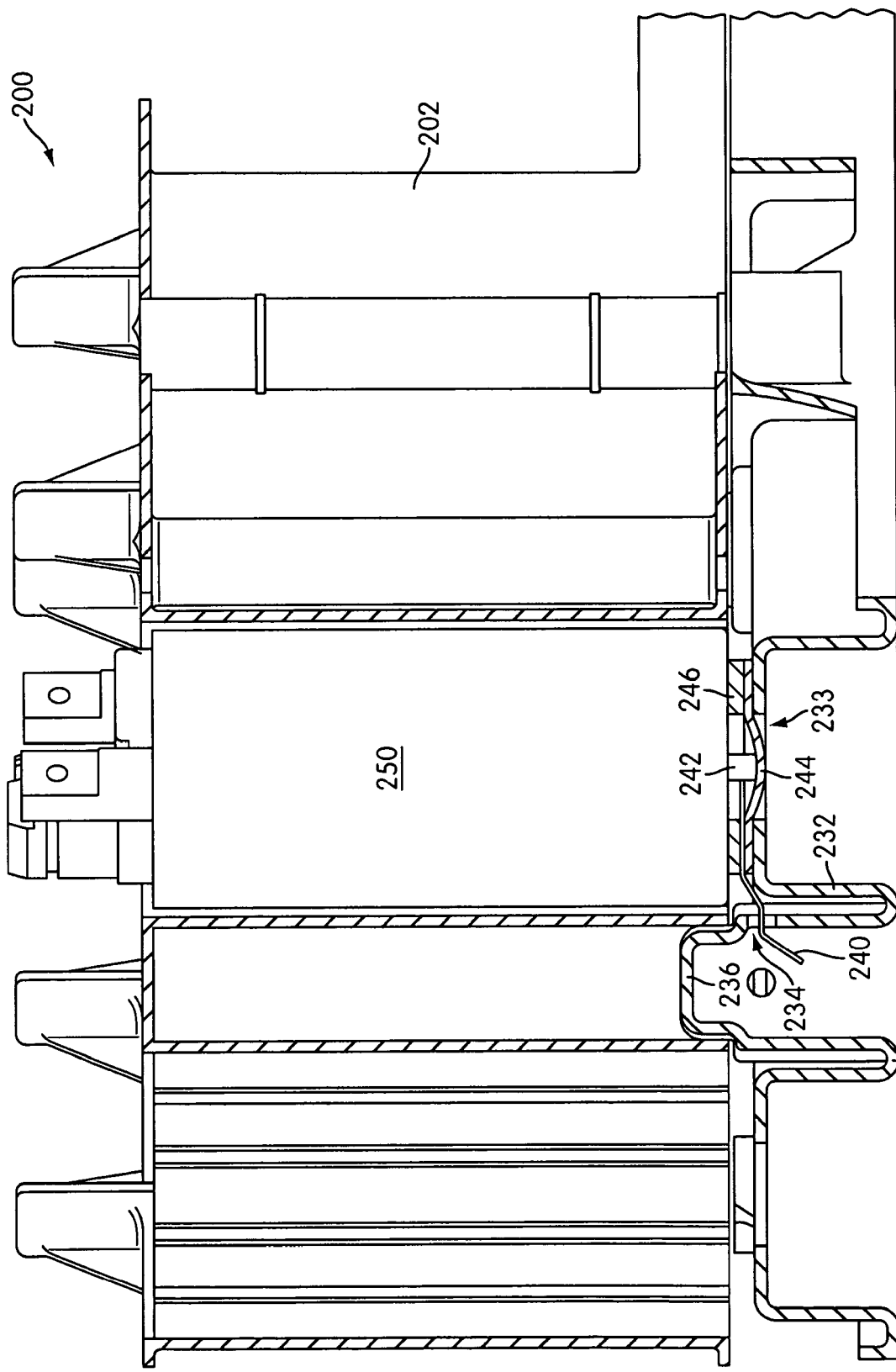
FIG. 7 is a cutaway plan view of a battery system or module having a temperature sensing device according to an exemplary embodiment.

FIG. 7 shows a battery module 200 having a plurality of cells 250 provided within a housing 202. A member or base 230 of the module 200 includes a plurality of features or platforms 232 on which the cells 250 are placed. A member or device 242 (e.g., a temperature sensor) is maintained in contact with a bottom surface of a cell 250 by a flexible member 244 such as a diaphragm and the force from the cell 250 held in place above the member 244 by the housing 202. It should be noted that while FIG. 7 illustrates only one device 242, any number of similar devices may be used. For example, one such device may be provided for each of the platforms (i.e., for each of the cells in the module).

Figure 8:
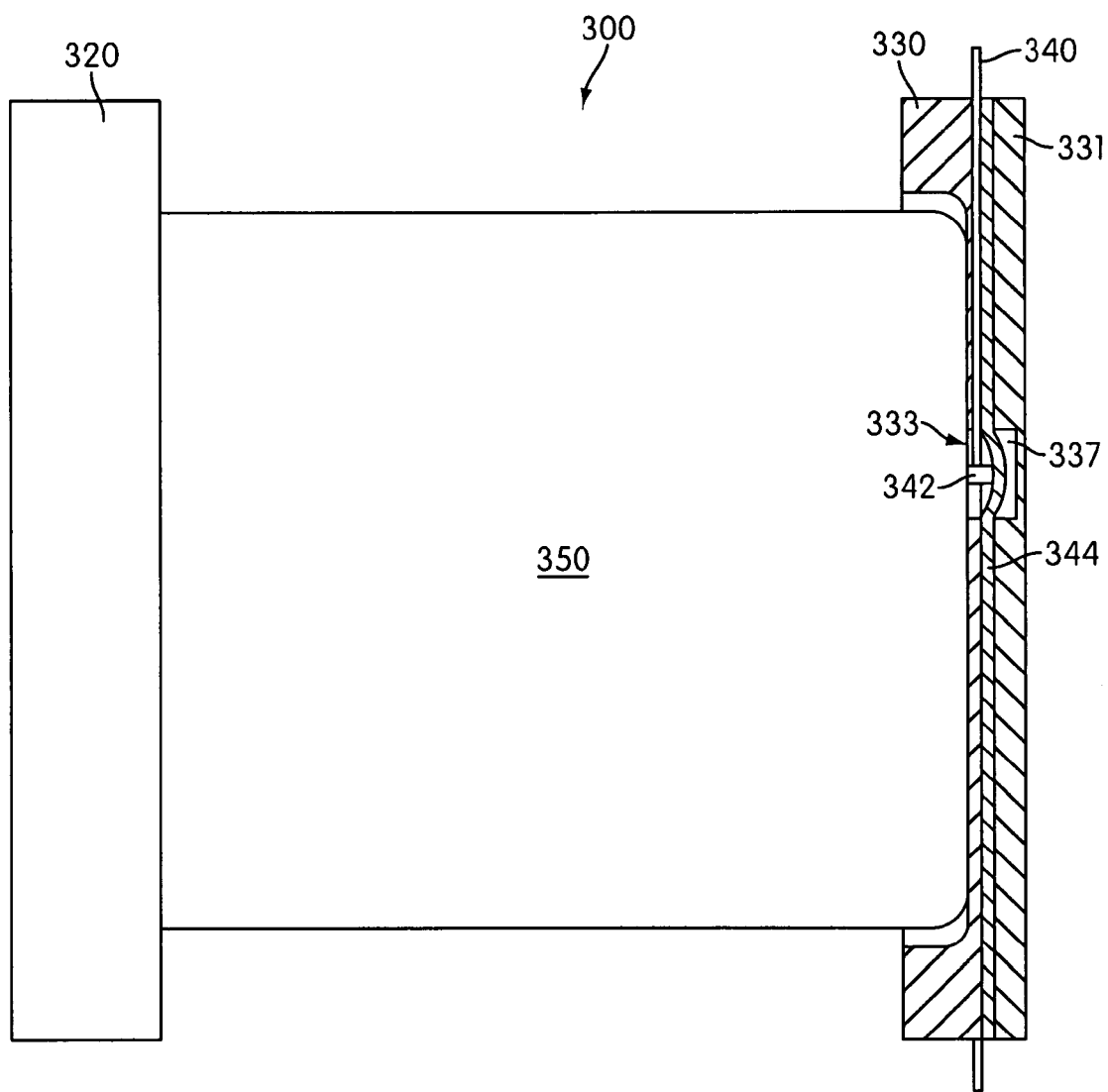
FIG. 8 is a cutaway plan view of a battery system or module having a temperature sensing device according to an exemplary embodiment.

FIG. 8 illustrates the use of a member or device 342 similar to the device 242 utilized in a battery system or module 300 having a plurality of generally prismatic cells 350. The cells 350 are provided between a first (e.g., top) cover 320 and a second (e.g., bottom) cover 330. A member or element 331 in the form of a plate or panel is provided to secure or clamp the first and second covers and cells together as a battery pack. An aperture or hole 333 is provided in the second cover 330, and the device 342 having one or more wires 340 coupled thereto is provided on a flexible member 344 provided between the second cover 330 and the member 331. A depression or cutout 337 is provided in the member 331 into which the device 342 and the flexible member 344 may extend when provided in contact with the cell 350. As shown in FIG. 8, the flexible member 344 constrains movement of the device 342 while maintaining it in close contact with a portion of the cell 350. As with the other exemplary embodiments shown and described herein, any number of devices 342 may be provided in the module 300 (e.g., one for each cell, etc.).

The flexible members (e.g., flexible members 244 and 344) may be provided as a single piece of adhesive-backed neoprene (or other suitable material) in the form of a diaphragm according to an exemplary embodiment. The adhesive may act to secure the flexible member to the temperature sensor. According to other exemplary embodiments, the flexible member does not include an adhesive for securing the member to a temperature sensor.

It should be understood by those reviewing this disclosure that temperature sensors may be provided as shown herein in a variety of different modules, including modules that utilize oval-shaped cells, prismatic cells, cylindrical cells, or other types of cells. For example, the cells shown having a generally oval shape may be provided in a module along with one or more temperature sensors that are held in contact with a surface of the cells by a flexible member such as a diaphragm.

It would be desirable to provide a battery system of a type disclosed in the present application that includes a battery system that includes one or more battery cells (e.g., lithium-ion cells, NiMH cells, etc.) for providing power to a vehicle. It would also be desirable to provide a battery system that includes a system for monitoring the temperature of a battery cell. Furthermore, it may be advantageous to provide a battery system that includes features for maintaining temperature sensors in contact with cells in the battery system.

Various advantages may be obtained by providing temperature sensors or the like in contact with batteries or cells using a flexible member such as a diaphragm. For example, battery modules using such a configuration may be assembled and disassembled relatively simply, and may use fewer components as compared to other battery modules having different temperature sensing configurations and devices. For example, no fasteners are required to secure the temperature sensor in position.

Another advantageous feature of the temperature sensor arrangement is that the mounting method maintains a relatively consistent and appropriate (e.g., not excessive) force holding the sensor to the cell while allowing for some dimensional variation of the components. Furthermore, an appropriate amount of holding force may reduce or eliminate damage to the sensors.

It is important to note that the construction and arrangement of the systems and structures shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise, and the nature or number of discrete elements or positions may be altered or varied. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the various exemplary embodiments without departing from the scope of the present inventions.

What is claimed is:

1. A battery system comprising:
   a platform having an aperture formed therethrough;
   a flat flexible member extending across the aperture;
   a cell provided adjacent the platform; and
   a sensor coupled to the flexible member and positioned proximate the cell, the sensor configured to detect a temperature of the cell.

2. The battery system of claim 1, wherein the flexible member is a separate component that is distinct from the platform.

3. The battery system of claim 1, wherein the sensor is aligned with the aperture.

4. The battery system of claim 1, further comprising an isolating member surrounding the sensor and positioned between the cell and the platform.

5. The battery system of claim 1, wherein the flexible member is configured to allow movement of the sensor relative to the aperture while maintaining the sensor proximate the cell.

6. The battery system of claim 1, wherein the sensor is positioned on a surface of the flexible member above the aperture.

7. The battery system of claim 6, wherein the sensor is coupled to the flexible member by an adhesive material.

8. The battery system of claim 1, further comprising a system for monitoring the temperature of the cell.

9. The battery system of claim 1, wherein the battery system comprises a plurality of cells, and each of a plurality of the cells is positioned adjacent a sensor that is coupled to a flexible member.

10. A battery system, comprising:
    a platform;
    a cell supported by the platform and having a bottom end;
    a flexible member positioned beneath the bottom end of the cell; and
    a sensor coupled to the flexible member and positioned proximate the bottom end of the cell;
    wherein the sensor is configured to detect a temperature of the cell.

11. The battery system of claim 10, wherein the flexible member is a separate component that is distinct from the platform.

12. The battery system of claim 10, further comprising an isolating member surrounding the sensor and positioned between the cell and the platform.

13. The battery system of claim 10, wherein the flexible member is configured to allow movement of the sensor while maintaining the sensor proximate the cell.

14. The battery system of claim 10, wherein the platform includes an aperture formed therethrough and the flexible member extends across the aperture to cover the aperture.

15. The battery system of claim 10, wherein the sensor is aligned within the aperture.

16. The battery system of claim 10, further comprising a system for monitoring the temperature of the cell.

17. A battery system, comprising:
    a platform including a top surface;
    a plurality of apertures extending through the top surface;
    a plurality of cells supported by the platform, each of the plurality of cells aligned with one of the plurality of apertures;
    a plurality of temperature sensors, each of the plurality of sensors provided proximate an end of one of the plurality of cells and aligned with the associated aperture;
    a plurality of flexible members, each of the flexible members positioned beneath an end of one of the plurality of cells and having a generally planar configuration that extends across the associated aperture; and
    wherein the flexible members are configured to support the associated sensor to allow movement of the associated sensor while maintaining it proximate the associated cell.

18. The battery system of claim 17, wherein each of the flexible members is a separate component that is distinct from the platform.

19. The battery system of claim 17, further comprising a plurality of isolating members, each of the isolating members surrounding a sensor and positioned between the associated cell and the platform.

20. The battery system of claim 17, further comprising a system for monitoring the temperatures of the plurality of cells.

* * * * *